March 30, 1954  E. G. SANDBERG  2,673,344
STAPLING MACHINE
Filed Sept. 13, 1952  9 Sheets-Sheet 1

Inventor:
Einar Gunnar Sandberg
By: Hill, Sherman, Meroni, Gross & Simpson
attys March 30, 1954  E. G. SANDBERG  2,673,344
STAPLING MACHINE Filed Sept. 13, 1952

Inventor
Einar Gunnar Sandberg

By: Attys.

March 30, 1954     E. G. SANDBERG     2,673,344
STAPLING MACHINE

Filed Sept. 13, 1952     9 Sheets-Sheet 8

March 30, 1954     E. G. SANDBERG     2,673,344
STAPLING MACHINE Filed Sept. 13, 1952     9 Sheets-Sheet 9

Inventor:
Einar Gunnar Sandberg
By: Attys.

Patented Mar. 30, 1954

2,673,344

UNITED STATES PATENT OFFICE

2,673,344

STAPLING MACHINE

Einar Gunnar Sandberg, Chicago, Ill., assignor, by mesne assignments, to United Mattress Machinery Company, Quincy, Mass., a corporation of Maine Application September 13, 1952, Serial No. 309,392

15 Claims. (Cl. 1—2)

This invention relates to improvements in staplers and more particularly relates to improvements in fluid pressure operated staplers of a type which form the staples from a continuous length of wire and drive the same.

An object of my invention is to provide a simple, efficient, novel and rugged stapler forming its own staples from a continuous length of wire and driving the same in a single staple driving operation.

A further object of my invention is to provide a novel and improved stapler of the fluid pressure operated type forming its staples from a continuous length of wire and driving the same in a single staple driving operation and arranged with a view toward utmost simplicity, compactness and efficiency in construction and operation.

A further object of my invention is to provide a simple and readily maneuverable stapler particularly adapted for stapling springs to the framing of box springs, and having an elongated nose readily fitting between the springs and formed at its end to engage the wire of the spring and guide the staple to pass along opposite sides thereof during the staple driving operation.

A still further object of my invention is to provide a simple and novel form of fluid pressure operated stapler having a central passageway extending therealong and a fluid operated staple drive plunger moving along said passageway, together with a novel form of anvil arrangement movable into and out of the passageway in cooperation with forming dies to form the staple and moving out of the path of the plunger upon the completion of the staple forming operation, to accommodate the plunger to move therebeyond and drive the staple.

Still another object of my invention is to provide a novel and improved form of fluid operated stapler for forming staples from continuous wire and driving the same in which the feeding of the wire and shearing thereof into staple lengths together with the forming of the wire into the form of staples is all operated by the operation of a single staple drive plunger.

A still further and more detailed object of my invention is to provide a novel and improved form of stapler for forming staples from a continuous wire wherein a reciprocating staple drive plunger operates to drive the staples, and wherein a simple form of feeding mechanism operated by the return stroke of the plunger is provided to intermittently feed the wire thereto in increments of staple length.

A still further object of my invention is to provide a novel and improved form of stapler for forming staples from continuous wire and driving the same, wherein reciprocating pivotally moving forming dies form the staple about an anvil and wherein one of the forming dies serves to shear the wire fed thereto to staple length and to point the wire during the shearing operation.

Still another and more detailed object of my invention is to provide a novel and improved form of stapler particularly adapted to staple the springs of box springs to the framing thereof in which increments of wire of staple length are fed to the staple drive plunger from a continuous strand of wire and are then sheared and formed to staple like form and driven all by the operation of the staple drive plunger.

These and other objects of my invention will appear from time to time as the following specification proceeds and with reference to the accompanying drawings wherein.

In the embodiment of my invention illustrated in the drawings, I have shown a stapler 10 having a housing 11 with a thin elongated nose 12 extending therefrom, along which staples 13 formed from a continuous length of wire 14 are driven by a staple drive plunger 15, to effect the stapling operation.

Figures 6, 7, 8, 9, 10:
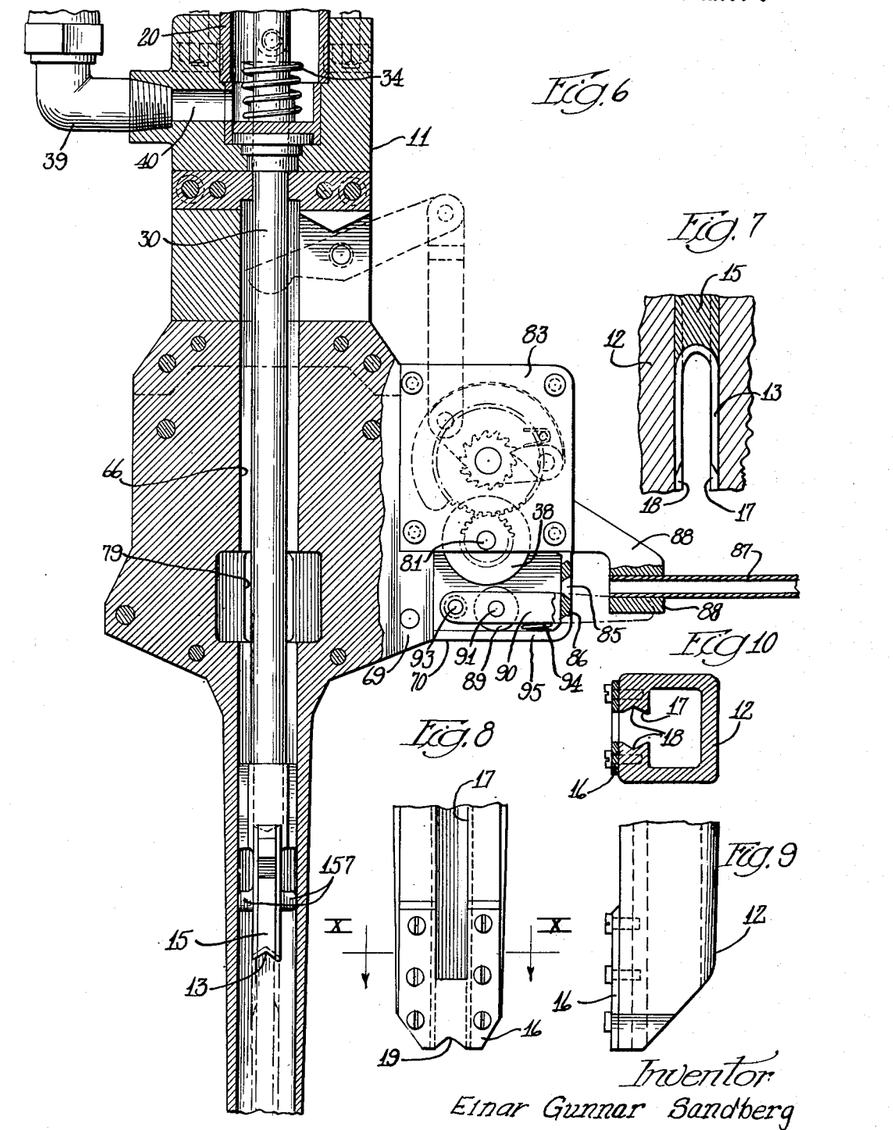
Figure 6 is an enlarged fragmentary longitudinal sectional view taken through the lower end of the cylinder and piston rod for driving the staple drive plunger along the stapler housing and nose thereof.
Figure 7 is an enlarged detail fragmentary sectional view taken through the nose of the stapler housing and showing the operation of driving a completely formed staple therealong.
Figure 8 is an enlarged fragmentary side view of the end portion of the nose of the stapler.
Figure 9 is an enlarged fragmentary end view of the stapler nose shown in Figure 8.
Figure 10 is a sectional view taken substantially along line X—X of Figure 8 and illustrating the staple guide.
Figures 12, 13:
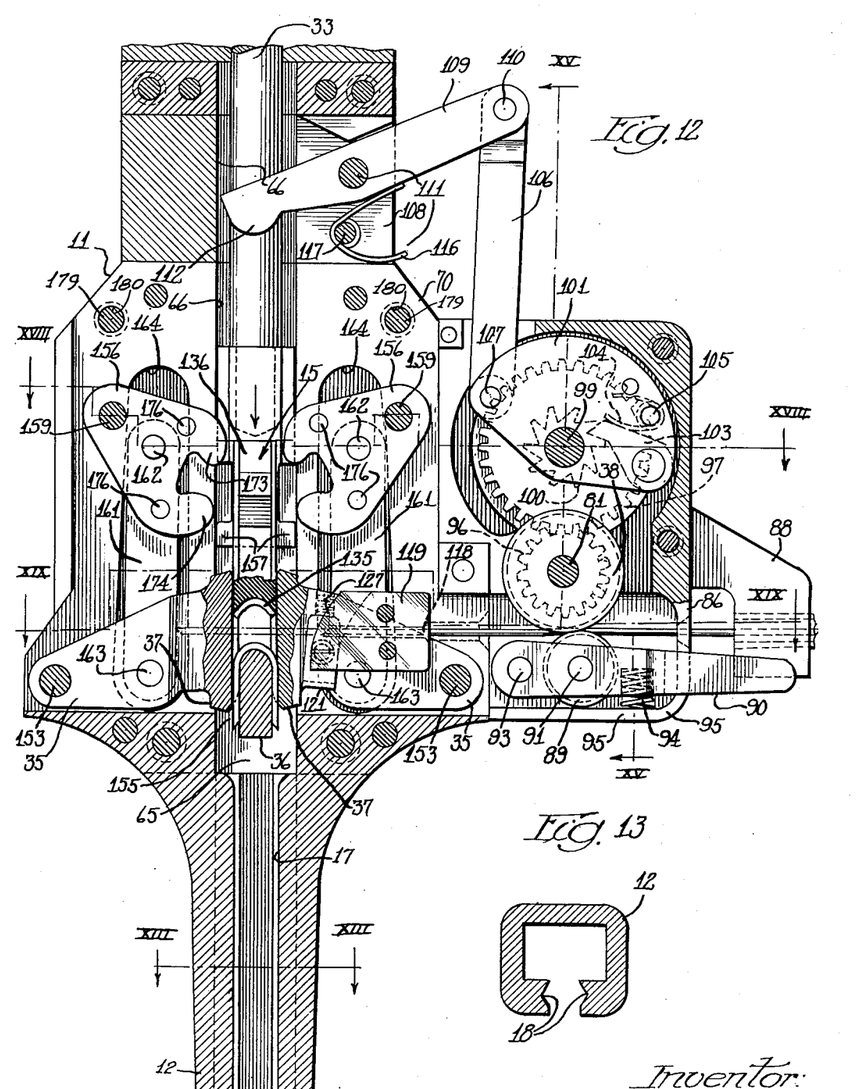
Figure 12 is a view somewhat similar to Figure 11 but showing the staple forming arms and dies at the completion of the staple forming operation.
Figure 13 is a transverse sectional view taken substantially along line XIII—XIII of Figure 12 showing the form of the staple guide at an intermediate position along the stapler nose.

As herein shown, the nose 12 is sufficiently long and thin to be inserted between the coils of a box spring from the top thereof into engagement with the bottom coil of the spring for stapling the spring to the spring frame, which usually is of wood. The nose 12 is shown as having a plate 16 secured to the front face thereof and closing an open guide 17, extending downwardly along said nose. The guide 17 is shown in Figures 7, 10 and 13 as having recessed V-shaped walls 18, for guiding the staple along the apices thereof and holding the staple in position during the driving operation thereof. The plate 16 also has a downwardly opening recess 19 engageable with the wire of the bottom coil of the spring and enabling the nose 12 to readily position and guide the staple to pass along opposite sides of the wire of the coil of the spring.

At the upper end of the housing 11 is a cylinder 20, which is recessed therein at its lower end, as shown in Figure 6, and extends upwardly therefrom.

The upper end of the cylinder 20 is closed by a head 21, secured thereto by tie rods 22, extending therethrough from the housing 11 and having nuts 23, 23 threaded on the opposite ends thereof. The nuts 23, 23 are shown as being in abutting engagement with the top of the head 21 and with undersurfaces of recesses 24, 24 formed in the housing 11.

A pipe 25 is shown as being threaded in the head 21 and leading therethrough to supply fluid under pressure to the head end of the cylinder 20. The pipe 25 is shown as having a valve 27 threaded on the upper end thereof. The valve 27 is provided to control the admission and release of fluid under pressure to and from the head and piston rod ends of the cylinder 20. The valve 27 may be of any well known form commonly used to admit and release fluid under pressure to and from fluid motors, so need not therein be shown or described in detail.

Movable within the cylinder 20 is a piston 29 and piston rod 30. The piston 29 may be of any well known form, and is herein shown as including two facing flexible cups 31, 31 which may be made from leather mounted on the upper end of the piston rod 30 and abutted at their outer ends by disks 32, 32. As herein shown, the lower disk 32 abuts an upwardly facing shouldered portion of said piston rod and the upper disk 32 is abutted by a nut 33 threaded on the upper end of said rod.

The piston rod 30 is shown as depending from the piston 29 and as being extensible downwardly through the bottom of the cylinder 20 into the interior of the housing 11 and as being movable therealong and as having the staple drive plunger 15 secured to the lower end thereof and offset therefrom. The length of the driving stroke of the piston 29 is shown as being limited by a spring 34 extending upwardly into the bottom portion of the cylinder 20. The spring 34 may be a relatively stiff spring, so as to form a positive yieldable stop for the piston 29.

The staple drive plunger 15 upon its driving stroke, effected by the admission of fluid under pressure to the head end of the cylinder 20, besides driving the staple also pivotally moves two pivoted forming arms 35, 35 having forming dies 37, 37 on the adjacent ends thereof into engagement with a length of wire to bend the wire over an anvil 36 and forms the wire to conform to the form thereof and also to retract the anvil, to accommodate said plunger to engage and drive the staple. Upon retractable movement of the piston rod 30 and staple drive plunger 15, said plunger also operates to effect operation of an intermittent feed roll 38, for feeding the wire 14 in increments of staple length and also returns the forming arms 35 and dies 37 into position to again be engaged with the wire on opposite sides of the anvil 36 and extends the anvil into operative position with respect to said dies, it being understood that the feeding of the wire is effected after the forming dies are in the retracted position shown in Figure 11.

The valve 27 is herein shown for illustrative purposes as being a spool type of valve having a spool or plunger movable within and along a valve block 43. Fluid under pressure is admitted to said valve block through a fitting 44, which may be connected with a flexible conduit connected with a source of supply of fluid under pressure such as air. The valve 27 is connected with the head end of the cylinder 20 through the pipe 25, and is connected with the piston rod end of the cylinder 20 through a pipe 45. A spring 47 seated between a shouldered portion of the valve block 21 and a sealing cap 48 secured to one end of the valve spool 41 by means of a nut 49, is provided to bias the valve spool 41 into position to admit fluid under pressure to the piston rod end of the cylinder 20 and retract the piston rod 30 and staple drive plunger 15.

A lever arm 50 connected with the opposite end of the valve spool 41 from the spring 47, is provided to move the valve spool into position to admit fluid under pressure to the head end of the cylinder 20 and to release fluid under pressure from the piston rod end thereof. The lever arm 50 is pivoted to a bracket 51 on a pivot pin 52. The bracket 51 is shown as extending downwardly and outwardly from the valve block 43. The free end of the lever arm 50 is shown as extending within a bifurcated end portion of the spool 41 and as having engagement with a pin 53 extending thereacross. The lever arm 50 is shown as being operated by a link 54 pivotally connected at one of its ends with said lever arm, intermediate the ends thereof. The link 54 is shown as being spaced from and extending along the block 43 and having connection at its end opposite the lever arm 50 with one lever arm of a bell crank 55. The other lever arm of the bell crank 55 extends inwardly from the pivot thereof and has an operating rod 56 pivotally connected thereto and depending therefrom. The rod 56 is shown as being slidably guided at its lower end in a bracket 58 conveniently located with relation to a hand grip 57 for the stapler. A finger grip 59, extending inwardly from the rod 56 is provided to be engaged by a finger of the hand holding the hand grip 57, to operate the valve 27 as desired.

Figure 11:
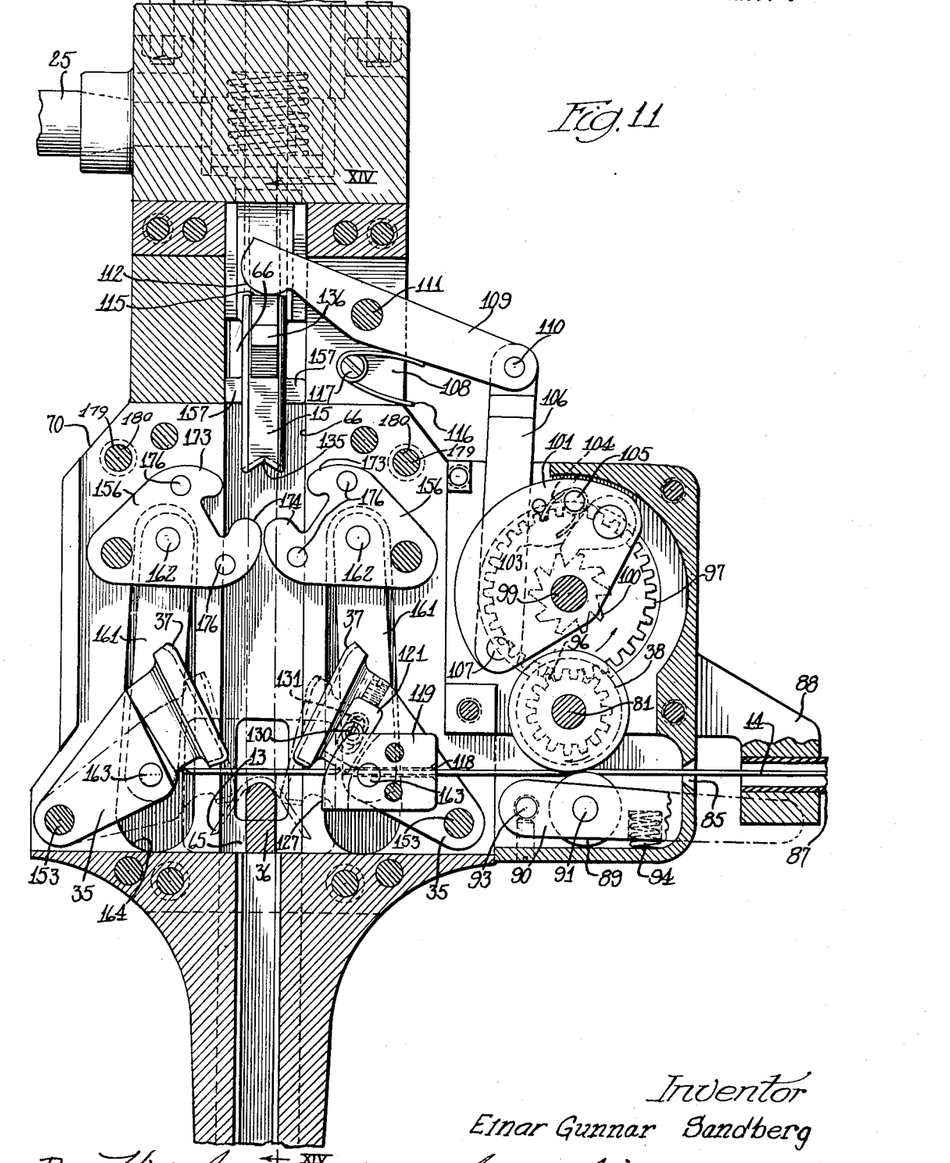
Figure 11 is a fragmentary enlarged longitudinal sectional view taken substantially along line XI—XI of Figure 2, but showing the anvil in position within the stapler housing.

The housing 11 is shown in Figures 11 and 12 as having a central forming chamber 65 therein with a guide passageway 66 for the piston rod 30 and staple drive plunger 15 leading thereinto from the cylinder 20, and the staple guide 17 leading therefrom along the nose 12. The forming chamber 65 is shown as being formed within a main front plate 69 of the housing 11 and as being partially closed by a back plate 70 secured to said front plate.

Figure 20:
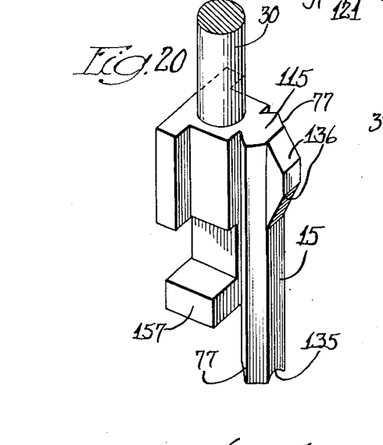
Figure 20 is a perspective view showing the lower end portion of the piston rod and the staple drive plunger.
Figures 21, 22:
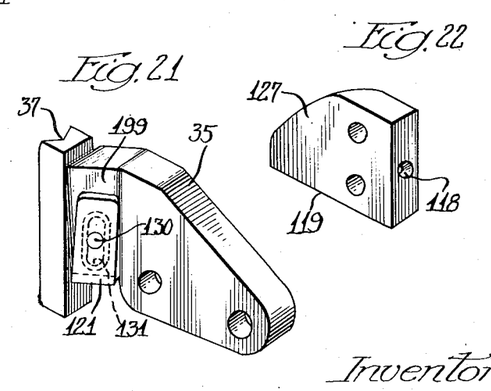
Figure 21 is a perspective view of one of the staple forming arms and dies, showing a shearing blade attached thereto for shearing the wire into staple length.
Figure 22 is a perspective view of the stationary wire cutting block cooperating with the shearing blade on the forming arm shown in Figure 21.
Figure 23:
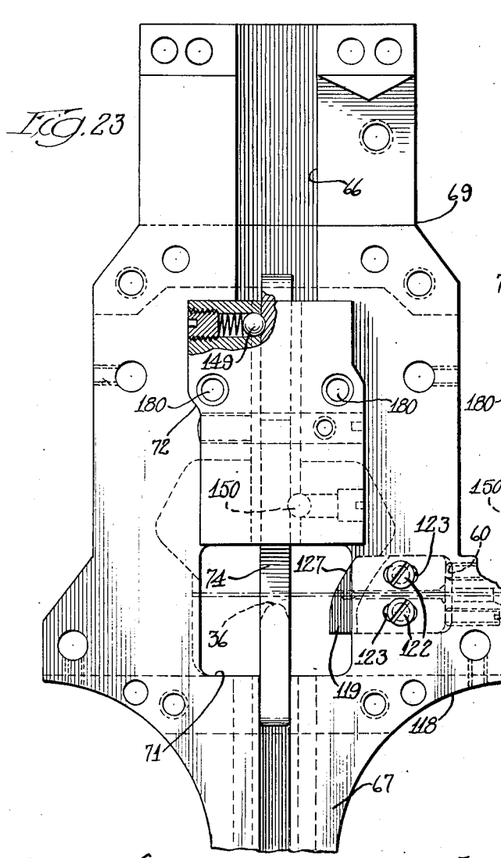
Figure 23 is an enlarged fragmentary view of the front plate of the stapler housing showing the anvil and wire cutting block mounted thereon.
Figure 24:
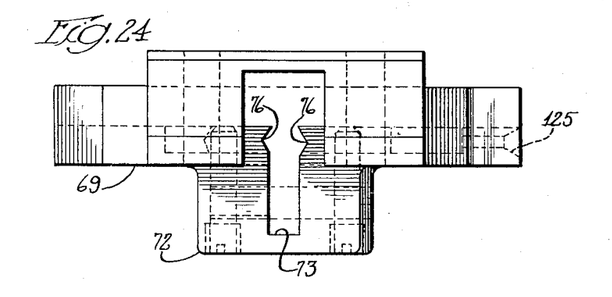
Figure 24 is a top plan view of the front housing plate shown in Figure 23.
Figure 25:
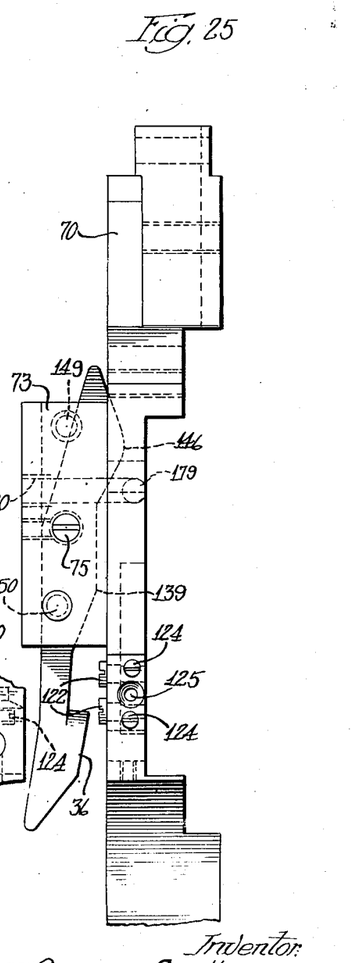
Figure 25 is a view in side elevation of the front housing plate shown in Figure 1 showing the anvil and wire guide to the staple forming chamber.

The front plate 69 as shown in Figures 1, 2 and 23 through 25 conforms generally to the form of the back plate 70 and is partially recessed therein. A relatively large opening 71 is provided in the plate 70 leading into the forming chamber 65 and affording a means of access to said chamber, to enable fouled staples to be removed therefrom. The front plate 69 is shown as having a block 72 mounted on the front face thereof and extending outwardly therefrom. The block 72 is shown as having a slot 73 extending therealong and opening to the inside of the front plate 69 and guide passageway extending therealong and the forming chamber 65 formed therein. A lever arm 74, shown as having the anvil 36 formed integrally with the lower end thereof is shown as extending along the slot 73 and as being pivoted to the block 72 on a pivot pin 75. The slot 73 is shown as having facing recessed V-shaped guides 76, 76 extending therealong in alignment with the guides 18, 18 and slidably engaged by corresponding and oppositely extending V-shaped guide surfaces 77, 77 (Figure 20) of the staple drive plunger 15 and forming a rectilinear guide for said plunger for a portion of the length of the stroke thereof.

Figure 26:
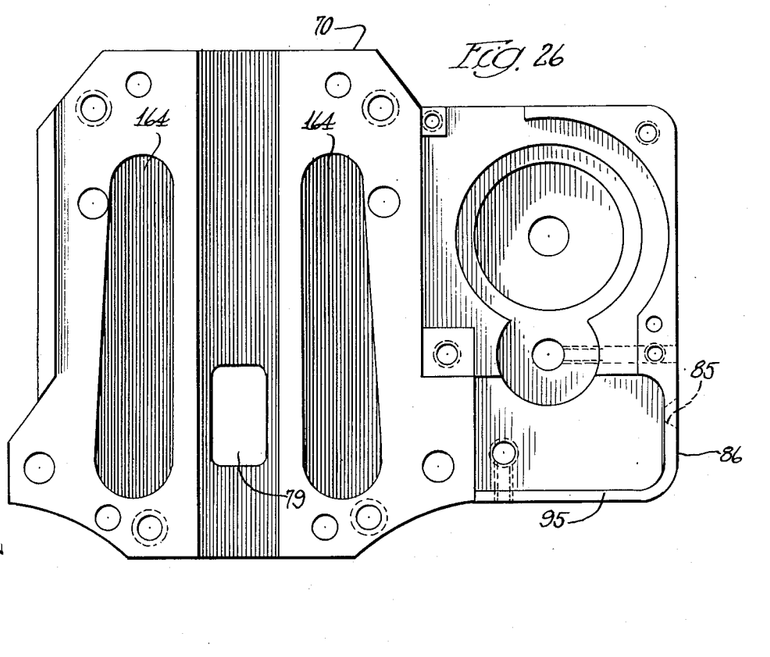
Figure 26 is a front view of the back plate for the staple housing.
Figure 27:
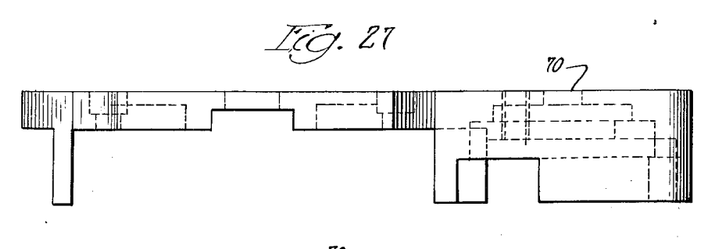
Figure 27 is a top plan view of the plate shown in Figure 26.
Figure 28:
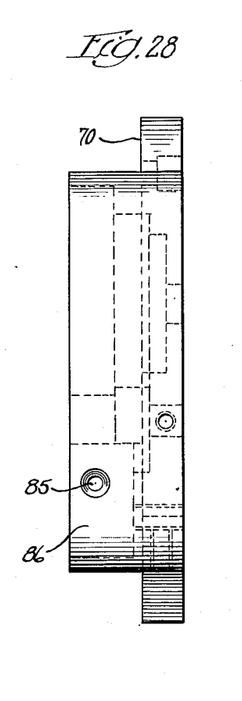
Figure 28 is a view in side elevation of the back plate shown in Figure 26.

The back plate 70 is shown in Figures 26, 27 and 28 as having an opening 79 therein registering with the central forming chamber 65 and with the open portion 71 of the front plate 69, and affording a means for clearing fouled or jammed staples from the forming chamber 65. The back plate 70 is also recessed to form a support and casing for the intermittently driven feed roll 38 and mechanism for driving said roll to intermittently feed the wire 14 to the forming chamber 65 in staple length increments.

Figure 15:
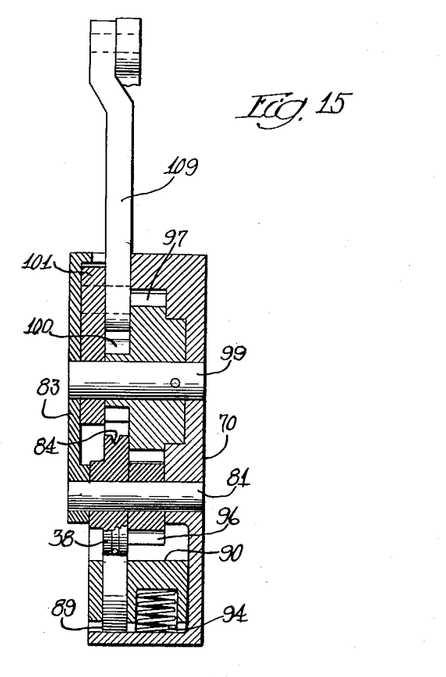
Figure 15 is a sectional view taken substantially along line XV—XV of Figure 12 and showing the feeding mechanism for the wire in transverse section.
Figure 16:
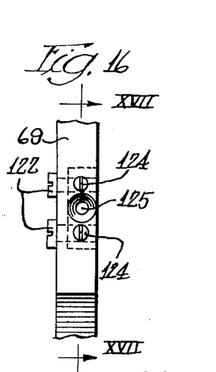
Figure 16 is an enlarged fragmentary detail end view looking toward the wire guide at the entering end of the stapler housing.
Figure 19:
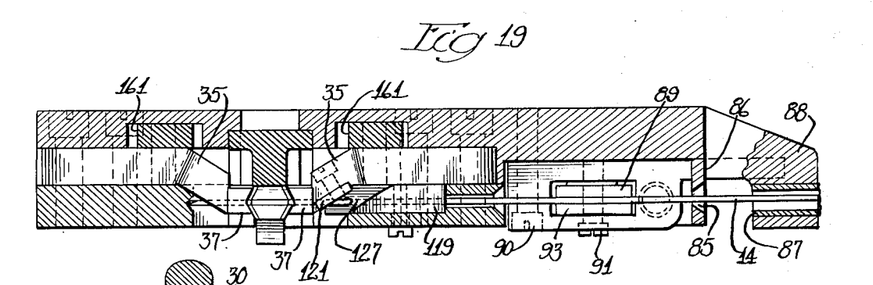
Figure 19 is a horizontal sectional view taken substantially along line XIX—XIX of Figure 12 in order to show certain details of the forming arms and dies and the cooperation thereof with the forming anvil.

The step-by-step feeding mechanism includes the feed roll 38, shown as being mounted on a transverse shaft 81. The shaft 81 is mounted at one of its ends in the back plate 70 and at its opposite end in a cover plate 83 therefor. The feed roll 38 is shown in Figure 15 as having a wire engaging groove 84 recessed in the periphery thereof and extending therearound. The groove 84 is shown as generally V-shaped in cross section with a curved bottom and engaging the wire with a wedging action to positively propel the wire into the forming chamber 65. The groove in the feed roll 38 is shown as being axially aligned with a guide aperture 85 formed in an end wall 86 of the rear plate 70. The guide aperture 85 is shown as being of a generally bell shaped form in axial alignment with a wire guide tube 87, shown as being mounted on and extending from a bracket 88 extending rearwardly from the wall 86 of the back plate 70 (see Figures 11 and 19).

The wire is maintained in engagement with the groove 84 in the feed roll 38 by a means of a pinch roll 89 having a flat periphery and shown as being rotatably mounted on a bifurcated lever 90, between the furcations thereof and intermediate the ends thereof, on a pivot pin 91. The lever 90 is shown as being pivotally mounted to the back plate 70 on a pivot pin 93. A compression spring 94 is shown as being interposed between a bottom wall 95 of the back plate 70 and under surface of the lever 90, to continually urge the pinch roll 89 into engagement with the feed roll 38. The end of the lever 90 projects outwardly from the back plate 70 and affords a means to be gripped by the fingers to release the pressure of the pinch roll 89 from the feed roll 38 when it is desired to initially thread wire to the stapler.

The feed roll 38 is herein shown as being intermittently driven through a step-by-step or ratchet feed, operated by movement of the piston rod 30 and plunger 15. As herein shown, a pinion 96 on the shaft 81 meshes with and is driven by a spur gear 97 on a shaft 99, mounted at its ends in the back plate 70 and the cover plate 83 for said back plate. The pinion 96 may be suitably secured to the feed roll 38 for rotating the same. The spur gear 97 may be suitably secured to the shaft 99 and is shown as being driven by a ratchet wheel 100, which also may be secured to said shaft. A rocking segment 101 is shown as being rockingly mounted on the shaft 99 and as having a pawl 103 pivoted thereto on the inner face thereof for engagement with the teeth of the ratchet wheel 100. The pawl 103 is shown as being yieldably engaged with the ratchet wheel 100 by a torsion spring 104 on a pin 105.

The sector 101 is rocked by a link 106, pivotally connected to the opposite end thereof from the pawl 103 on a pivot pin 107. The upper end of the link 106 is shown as being pivotally connected to the outer end of a rocking arm 109 on a pivot pin 110. The rocking arm is shown as being pivoted intermediate its ends to the housing 11 on a pivot pin 111 and as extending through an opening 108 in said housing. The rocking arm 109 has a camming or engaging end 112 extending into the passageway 66. The engaging end 112 is engageable with an upper abutment surface 115 of the staple drive plunger 15 upon the return strokes thereof. This effects pivotal movement of the rocking arm 109 in a clockwise direction and the sector 101 in a counter-clockwise direction to rotate the ratchet teeth 100 and the gear 97 in a counter-clockwise direction, and drive the feed roll 38 in a clockwise direction a distance sufficient to feed increments of wire of staple length to the chamber 65, during each return stroke of the staple drive plunger 15. The rocking arm 109 is biased in the retracted position shown in Figure 12, to be engaged and operated by the staple drive plunger 115 by means of a torsion spring 116. The torsion spring 116 is shown as being mounted on a pin 117 mounted in the opening or slot 108 of the housing 11 and as engaging the rocking arm 109 at one of its ends and the bottom of the opening 108 at its opposite end (see Figures 11 and 12).

From the feed roll 38 and the pinch roll 89, the wire 14 is shown as passing through a wire guide 118 in a stationary wire cutting block 119 (see Figures 11, 12, 17, 19, 22 and 23).

Figure 17:
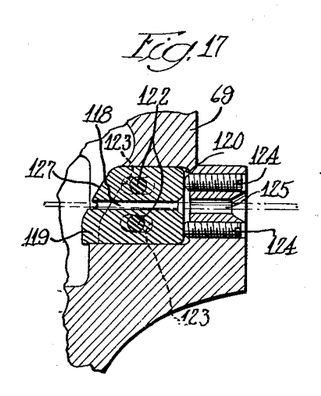
Figure 17 is a sectional view taken substantially along line XVII—XVII of Figure 16 and showing certain details of the wire guide not shown in Figure 16.
Figure 18:
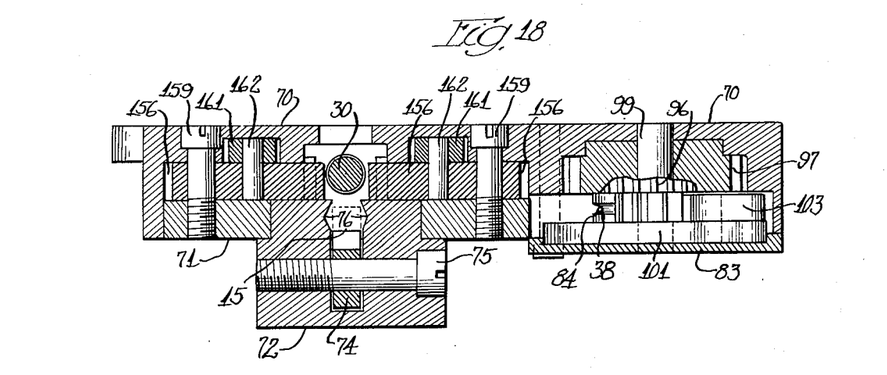
Figure 18 is a horizontal sectional view taken substantially along line XVIII—XVIII of Figure 12 and showing certain details of the feeding mechanism and support for the actuating cams for the forming dies.

The wire cutting block 119 is shown in Figure 17 as being adjustably mounted in a slot 120 formed in the front plate 69 of the housing 11 for adjustable movement therealong to adjust said block with respect to a cutting blade 121, shown as being mounted on the right hand forming arm 35 inwardly of the die 37, thereof. The cutting block 119 is secured in position to the front plate 69 by means of two vertically spaced screws 122, 122 threaded in said cutting block and passing through elongated slots 123, 123 extending along said plate.

Adjustment of the cutting block 119 along the guide or recess 120 is effected by means of two set screws 124, 124, threaded in the end wall of the plate 69 and engaging a rear wall of the cutting block 119. An enlarged diameter wire guide or aperture 125 having a converging or bell shaped entering end leads through said wall in axial alignment with the guide 118 of the cutting block 119.

The wire cutting block 119 is shown as having an advance face 127 generally conforming to the path of movement of the cutting blade 121 and cooperating therewith to shear the wire at an angle along said face, and thus point the advance end of the wire within the guide 118 and the retreating end of the wire positioned for forming, upon downward movement of the forming arms 35, 35 and dies 37, 37.

The cutting blade 121 is shown as being secured to an angularly disposed face 199 of the right hand forming arm 35 just inwardly of the die 37 thereof by means of a set screw 130. The screw 130 is shown as extending from the inner end of the forming die through a vertically extending slot 131 therein and as having threaded engagement with the cutter blade 121. The angular face 199 besides positioning the cutter blade 121 in the proper position to cooperate with the arcuate face 127 of the wire cutting block 119 also offsets the forming die 37 from the main body of the forming arm 35, to position the center of the die surface in direct alignment with the center of the wire to be formed.

Referring now to the staple forming mechanism and operation, the staple drive plunger 15 is shown as being offset outwardly from the piston rod 30 and as being guided within and movable along the recessed guides 76, 76 prior to and during the staple forming operation, and along the guides 18, 18 formed in the nose 12 during the staple driving operation. The lower end of the staple drive plunger 15 is shown as being recessed as indicated by reference character 135. The recess 135 opens toward the ground and generally conforms to the form of the closed end of the finished staple and serves to engage the closed end of the staple and move it into and propel it along the guides 18, 18 and drive the staple over a coil of wire. The recess 135 is shown as being sufficiently deep to accommodate the staple to be fully engaged with a coil of the spring.

The staple drive plunger 15 is likewise shown as having oppositely inclined cam surfaces 136, 136 formed thereon which are engageable with spaced cam surfaces 139 and 140 of the anvil arm 74 spaced on opposite sides of the pivot pin 75 to retract said anvil from the forming chamber 65 upon completion of the forming operation of the staple and accommodate the staple to be propelled along the guide 67 by the plunger 15 and to extend said anvil within the forming chamber 65 upon the return stroke of the drive plunger 15. Two detent balls 149 and 150 are provided on opposite sides of the pivot pin 75 to hold the rocking arm 74 and anvil 36 in operative and retracted positions with respect to the forming chamber 65. The two detent balls 149 and 150 are spring pressed and the ball 149 is engageable with a recess 151 formed in the rocking arm 143 adjacent the upper or outer end thereof, to yieldably hold the anvil 36 within the forming chamber 65. The detent ball 150 is spaced on the opposite side of the pivotal axis of the rocking arm 74 from the detent ball 149 for engagement with a detent recess 152 formed in the rocking arm 74, to hold the anvil 36 out of the way of the plunger 15 during the staple driving operation thereof.

The forming arms 35, 35 are shown as being pivoted on opposite sides of the forming chamber 65 on pivot pins 153, 153 mounted at their ends in the plates 69 and 70 and suitably locked thereto. The forming arms 35, 35 are of similar construction except the right hand or advance forming arm also carries the wire cutting blade 121, as has been previously described. The forming dies 37, 37 are of a recessed generally V-shaped form in cross section, the depth of the recess depending upon the gauge of wire used, and pivot downwardly along opposite sides of the anvil 36 into engagement with the wire and draw the wire downwardly along opposite sides of the anvil 36 and conform the wire to the form thereof. The dies remain in the position shown in Figure 12 upon withdrawal of the anvil and have guiding engagement with the inclined guide surfaces of the staple drive plunger 15, and guide said plunger from the guides 76, 76 to the guides 18, 18.

The forming arms 35, 35 are operated by actuating cams 156, 156 mounted between the plates 69 and 70 on pivot pins 159, 159. Said actuating cams are shown as being disposed above the forming arms 35, 35 inwardly of said forming arms and in direct alignment with camming lugs 157, 157 extending laterally from the staple drive plunger 15. As herein shown, links 161, 161 are pivoted to the actuating cams 156, 156 intermediate the ends thereof on pivot pins 162, 162. Said links have pivotal connection with the actuating arms 35, 35 adjacent the lower ends thereof and intermediate the ends thereof on pivot pins 163, 163. The links 161, 161 are shown as being recessed within and movable along recesses 164, 164 formed in the back plate 70.

The actuating cams 156, 156 have facing vertically spaced camming surfaces 173, 174 adapted to be engaged by the camming lugs 157, 157, on the plunger 15 to pivot the cams 156, 156 upwardly upon the return stroke of the staple drive plunger by engagement of the camming lugs with the camming surfaces 173, 173. This will pivot the forming arms 35, 35 upwardly of the path of travel of the wire into the position shown in Figure 11.

The camming lugs 157, 157 are engageable with the camming surfaces 174, 174 of the actuating cams 156, 156 upon the staple driving stroke of the plunger and positively pivot the actuating cams 156, 156 downwardly and move the forming arms 35, 35 and dies 37, 37 simultaneously downwardly to first effect the severing and pointing of the wire into a piece of staple length extending across the forming chamber 65 into position to be engaged by the undersurfaces of the forming dies 37, 37 and then finish bend the wire about the anvil 36.

The cams 156, 156 are each provided with spaced detent recesses 176, 176 herein shown as being formed in the camming projections 173 and 174. The recesses 176, 176 are adapted to be engaged by spring urged detent balls 179, 179 mounted in drilled holes 180 in the block 73 and extending therethrough from the outer face thereof. The detent balls 179, 179 are provided to hold the actuating cams 156, 156 and the forming arms 35, 35 and dies 37, 37 in the upwardly extending position shown in Figure 11 and in the guiding position shown in Figure 12 until positively moved out of said positions by operation of the actuating cams 156, 156 effective by movement of the staple drive plunger 15 on its driving and return strokes.

In operation of the stapler, the staple drive plunger 15 is moved to its uppermost position along the guide passageway 66 by the admission of fluid under pressure to the piston rod end of the cylinder 20, upon the release of the finger grip 59 on the rod 56. During return movement of the plunger 15, the upper camming surface 136 will first engage the camming surface 140 on the anvil arm 74 and extend the anvil within the forming chamber 65. The camming lugs 157, 157 will then engage the camming surfaces 173, 173 on the actuating cams 156, 156 and pivot said cams and the forming arms 35, 35 to the upwardly extended position shown in Figure 11. The engaging surface 115 of the plunger 15 will then engage the camming end 112 of the rocking arm 109 and pivot said rocking arm to the upwardly extended position shown in Figure 11 and effect the feeding of an increment of wire of staple length to the forming chamber 65.

Figures 1, 2, 3:
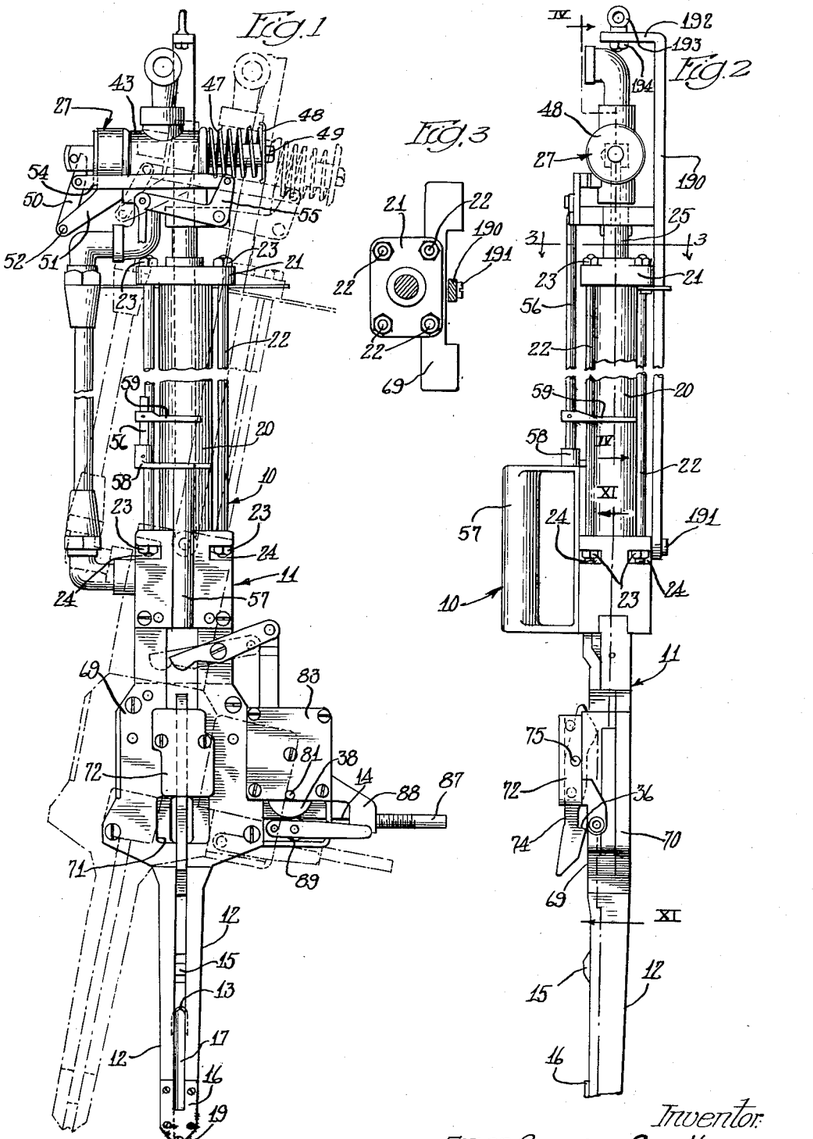
Figure 1 is a view in side elevation of a stapler constructed in accordance with my invention showing a staple being driven along the staple guide in the nose of the stapler.
Figure 2 is an end view of the stapler shown in Figure 1 with the staple drive plunger in substantially the same position as in Figure 1.
Figure 3 is a fragmentary sectional view taken substantially along line III—III of Figure 2.
Figures 4, 5:
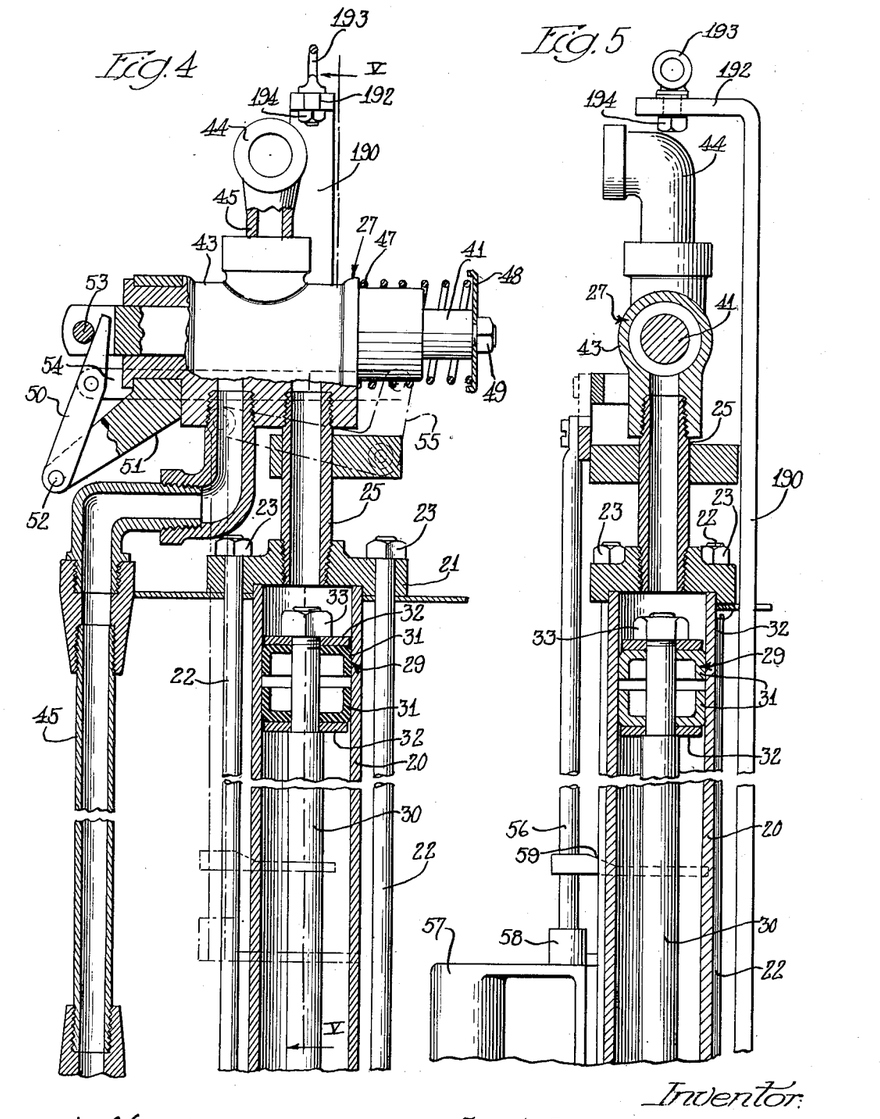
Figure 4 is a sectional view taken substantially along line IV—IV of Figure 2 and showing the cylinder and piston for operating the staple drive plunger.
Figure 5 is a sectional view taken substantially along line V—V of Figure 4.

Upon the exertion of pressure on the finger grip 59 to move the valve spool 41 to the left from the position shown in Figure 1, fluid under pressure will be admitted to the head end of the cylinder 20. This will effect the staple driving stroke of the piston 29, piston rod 30 and staple drive plunger 15. The camming lugs 157, 157 of the staple drive plunger 15 will first engage the camming surfaces 174, 174 of the actuating cams 156, 156 and pivot said cams downwardly. This in turn will effect downward pivotal movement of the forming arms 35, 35 through the links 161, 161. Initial downward movement of the forming arms 35, 35 will move the cutter blade 121 along the inclined surface 127 of the cutter block 119, and sever the staple wire into a piece of staple length and point an end thereon.

Figure 14:
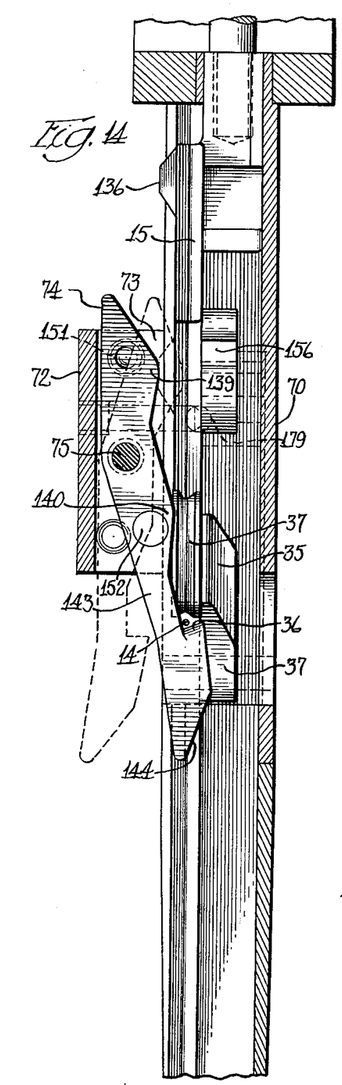
Figure 14 is a sectional view taken substantially along the line XIV—XIV of Figure 11 and showing the forming anvil extended within the forming chamber of the stapler.

The lower ends of the forming dies 37, 37 will then engage the upper surface of the wire of staple length on opposite sides of the anvil 36 and initially bend it over said anvil to the form shown by dot and dash lines in Figure 11. Continued movement of the forming arms and dies will pivot the dies downwardly into substantially parallel relation with respect to the sides of the anvil 36 and form the opposite legs of the staple along said anvil to conform to the form thereof. The advance inclined camming surface of the cam 136 will then come into engagement with the cam 140 and pivot the anvil 36 outwardly out of the forming chamber 65 about the axis of the pivot pin 75. The anvil 36 and rocking arm 74 will now be held in the outwardly extended position shown by solid lines in Figures 2 and 24 and by broken lines in Figure 14 by the detent ball 150. The staple held in position in the apices of the dies 37, 37 will then be engaged by the recessed end portion 135 of the staple drive plunger 15 and be driven thereby along and out of the forming dies into and along the facing V-shaped recesses 18, 18 of the guide 17 along the nose of the stapler.

Continued movement of the staple drive plunger 15 will then eject the staple from the end of the nose 12 along opposite sides of the wire of a spring coil, and drive the staple into the spring framing.

It should here be understood that the forming and driving operation is a continuous operation and that during the entire cutting, forming and driving operations, the staple drive plunger 15 is in continuous motion, the cutting, initial and final forming operations, the withdrawal of the anvil from the staple and the engagement thereof with the driving plunger all being in a predetermined timed sequence and accommodating free movement of the drive plunger with no interruptions thereof.

Upon release of the finger from the finger grip 59, the spring will return the valve spool 41 in position to relieve pressure from the head end of the cylinder 20 and admit fluid under pressure to the piston rod end thereof and withdraw the piston rod 30 and staple drive plunger 15. During return travel of the staple drive plunger 15, the anvil 36 will be extended into the forming chamber 65 and will be held therein by engagement of the lever 74 with the detent ball 149. The forming arms 35, 35 will then be returned to the upwardly extended positions shown in Figure 11 and a new length of staple wire will be fed to said forming chamber, as previously described. The stapler is then ready for another driving operation upon operation of the valve 27 by engagement of the finger with the finger grip 57, as previously described.

It should here be noted that when stapling spring coils to the frames of box springs it is advantageous to suspend the entire stapler for convenience in operation thereof. To this end, a hanger 190 is pivoted to the housing 11 adjacent the upper end thereof and adjacent the lower end of the cylinder 20 on a pivot pin 191. The hanger 190 is shown as having an inwardly turned upper arm portion 192 extending at right angles with respect to the main body thereof and having an eye bolt 193 extending therethrough and secured thereto as by a nut 194. The eye bolt 193 may be attached to a suspension support, so arranged as to suspend the stapler for operation and accommodating the stapler for up and down and tilting movement with respect to the spring framing for insertion within the frame, to engage the recessed end thereof with the wire of a spring coil and guide a staple to be driven along opposite sides of the wire and secure the same to the spring frame.

It should here be understood that while I have herein referred to the stapler as being used to staple or secure springs to the framing for box springs, that it need not be used for this purpose and may be used for any desired stapling purpose.

It will be understood that various modifications and variations of the present invention may be effected without departing from the spirit and scope of the novel concepts thereof.

I claim as my invention:

1. A stapler comprising a housing having a guide nose extending therefrom with a staple guide within said nose and extending therealong, a staple drive plunger movable along said housing and nose and having a staple engaging and driving recess on the end face thereof, a fluid pressure operated cylinder and piston mounted on said housing on the opposite side thereof from said guide nose and having connection with said plunger to reciprocably move said plunger within and along siad housing and nose to effect the staple driving operation, a feed roll and a pinch roll mounted on said housing to engage the wire with said feed roll to feed wire into said housing in staple length increments, intermittent drive mechanism actuated by said plunger to drive said feed roll, a shearing block mounted within said housing and having the staple wire guided therethrough in alignment with the point of engagement of said feed and pinch rolls and also having an inclined advance face, and means actuated by movement of said plunger upon the staple driving stroke thereof to shearing the wire along said face to staple length and form the same to staple form comprising two forming dies pivoted within said housing on opposite sides of the path of travel of said drive plunger and having adjacent die faces moved by said plunger into parallel relation with respect thereto upon the driving stroke thereof, and one of said dies having a shearing blade thereon cooperating with the inclined face of said cutting block to shear the wire to staple length upon the driving stroke of said plunger prior to the forming of the wire into staple form.

2. A stapler comprising a housing having a guide nose extending therefrom with a staple guide extending within and along said nose, a staple drive plunger guided for movement within said housing and nose, said plunger having a staple engaging end face for progressing a staple within said housing and nose to the end thereof and driving the same, a fluid operated motor to reciprocably move said driving plunger within said housing and nose, means actuated by operation of said plunger to intermittently feed staple wire within said housing, means to sever the wire to staple length and to point the ends thereof comprising a cutting block secured to said housing having a wire guide extending therethrough and an inclined advance face, a shearing blade movable along said face to sever the wire at the inclination thereof, and two spaced facing forming dies pivoted within said housing to move from positions above said cutting block downwardly into parallel relation with respect to each other along opposite sides of the path of travel of said staple drive plunger along said housing, one of said dies having said shearing blade secured thereto to move said blade along said inclined surface of said cutting block, both of said forming dies and arms being moved into forming engagement with the staple wire by movement of said staple drive plunger upon the driving stroke thereof, an anvil movable into the space between said dies and retractable therefrom, cam means on said plunger to operate said forming dies, and other cam means on said plunger engageable with said anvil to retract the same from the path of travel of said plunger upon the completion of the staple forming operation, and to move said anvil into operative position upon the return stroke of said plunger.

3. In a stapler of the class described, a housing, a plunger guided to move within said housing to the end thereof, and to eject the finished staple from the end of said housing, a feed roll to feed a continuous length of wire into said housing in a direction transverse to the path and travel of said plunger along said housing, means actuated by reciprocable movement of said plunger to drive said feed roll, an anvil pivotally mounted on said housing to move into and out of the path of travel of said plunger along said housing, a cam on said plunger engaging said anvil to position the same in operative and inoperative positions, two pivoted forming dies pivotally mounted within said housing on opposite sides of said anvil, cam means operable by movement of said plunger to actuate said forming dies, and a cutter on one of said forming dies to cut the wire to staple length.

4. In a stapler of the class described, a housing, a plunger guided to move within and along said housing, feed mechanism to feed the wire into said housing in a direction transverse to the path of travel of said plunger comprising a feed roll and step-by-step drive mechanism actuated by said plunger to drive said feed roll, an anvil pivotally mounted on said housing to move into and out of the path of travel of said plunger, a cam on said plunger engageable with said anvil to position the same in operative and inoperative positions, two forming dies pivoted within said housing beneath said feed roll and movable into position to extend along opposite sides of said anvil, actuating cams for said dies pivoted in said housing and having operative connection therewith, and camming means on said plunger engageable with said cams to actuate the same to pivot said forming dies in a forming direction into cooperation with said anvil.

5. In a stapler of the class described, a housing having a central forming chamber therein, a staple guide passageway extending in said housing from said chamber to the end of said housing, a staple drive plunger movable along said chamber and staple guide passageway to the end thereof, feeding mechanism operated by movement of said plunger to feed a continuous strip of wire into said chamber in a direction normal to the path of travel of said plunger including a feed roll spaced from said chamber, and means actuated by said plunger to intermittently drive said feed roll, an anvil movably mounted on said housing to move within said chamber into a position beneath the line of travel of said wire, two forming dies pivotally mounted within said housing on opposite sides of said anvil to move from a position above the line of travel of said wire downwardly into engagement therewith to form the wire on said anvil. one of said dies having a shear thereon to cut the wire to staple length, and means operated by movement of said plunger and operatively connected with said forming dies to simultaneously move said dies on the working stroke of said plunger to first shear the wire and then form the wire on said anvil.

6. In a stapler of the class described. a housing having a central forming chamber. a staple guide passageway in said housing extending from said forming chamber and opening to one end of said housing, a staple drive plunger movable into and out of said chamber to the end of said staple guide passageway, a step-by-step feeding mechanism mounted on said housing and actuated by said plunger to intermittently supply wire to said chamber, an anvil pivoted on said housing outside of said chamber to move into said chamber beneath the line of travel of wire thereinto, means actuated by said plunger, to move said anvil into and out of said chamber, two forming dies pivotally mounted on said housing on opposite sides of said chamber to move from positions above the line of travel of the staple wire downwardly into engagement therewith and along opposite sides of said anvil, two actuating cams engageable by said plunger and actuated thereby upon movement thereof on the driving and return strokes, links operatively connecting said cams with said forming dies to move the same into position above said anvil upon the return stroke of said plunger and downwardly along opposite sides of said anvil on the drive stroke thereof, a cam on said drive plunger, and spaced cooperating cams on said anvil at points spaced from the anvil surface thereof to withdraw said anvil from the path of travel of said plunger upon the drive stroke thereof and to move said anvil into the path of travel of said plunger upon the return stroke thereof.

7. In a stapler of the class described, a housing having a central forming chamber and a staple guide passageway extending therefrom having recessed converging walls guiding the legs of the staple for movement along said passageway, a staple drive plunger guided for movement into said chamber and within and along said staple guide passageway to the end thereof, feeding mechanism actuated by said plunger to intermittently supply wire to said chamber in increments of staple length, a rocking arm pivotally mounted on said housing and having an anvil on the end thereof, spaced cams on said rocking arm, and cooperating cams on said plunger to move said anvil into said chamber upon the return stroke of said plunger and out of said chamber at the end of the staple forming operation prior to the staple driving operation of said plunger, two facing rectilinear forming dies recessed to engage the wire in the center of the recesses thereof and bend the wire to the form of said anvil upon movement of said dies along said anvil, means pivotally mounting said dies on said housing on opposite sides of said chamber, separate actuating cams connected with each of said dies and engaged by said plunger upon movement thereof on its driving and return strokes, a cutter block extending along the advance of said forming dies and having an inclined cutting face and a wire guide opening into said inclined face, and a shearing blade on the adjacent of said forming dies movable along said block and inclined face to sever the wire into staple length and to point the end thereof at the initiation of the staple forming stroke of said forming dies.

8. In a stapler, a housing having a forming chamber and a staple guide passageway extending therefrom, a staple drive plunger guided for movement in said forming chamber and staple guide passageway, a fluid operated motor for moving said plunger in and along said chamber and passageway, feed mechanism operated by engagement with said plunger to intermittently feed staple wire to said chamber, a lever arm pivotally mounted intermediate its ends on said housing outside of said forming chamber, an anvil on one end of said lever arm and movable into position on one side of the line of travel of the wire into said chamber, two spaced cams on said lever arm on opposite sides of the pivotal axis thereof, a cooperating cam on said drive plunger to engage one of said cams during the driving stroke thereof to move said anvil out of the path of travel of said plunger and the second of said cams on the return stroke thereof to move said anvil to an operative position within said forming chamber, two spaced forming dies pivotally mounted within said housing on one side of the line of travel of the wire into said chamber and movable from a position on the opposite side of the line of travel of the wire into said chamber downwardly to a position along opposite sides of said anvil, and cam means actuated by movement of said plunger on its driving stroke to move said dies along said anvil, to effect forming of the staple thereon.

9. In a stapler of the class described, a housing having a central forming chamber and a staple guide passageway extending therefrom, a feed roll rotatably journaled in said housing and a pinch roll engageable therewith to feed a continuous length of wire in said housing, a ratchet device to intermittently drive said feed roll and a rocking arm to actuate said ratchet device, a lever arm pivotally mounted on said housing intermediate its ends and having an anvil on the free end thereof and carrying the same into and out of said forming chamber, two spaced forming arms pivotally mounted in said housing on opposite sides of said anvil and having forming dies on the adjacent ends thereof to move with said arms to extend along opposite sides of said anvil, a staple drive plunger guided to move within and along said chamber and staple guide, fluid operated motor means to move said plunger in staple drive and return directions, and individual engaging cams on said plunger at points spaced therealong to actuate said rocking arm and intermittent feed, to move said forming dies on their forming and retracting strokes and insert said anvil within and to withdraw said anvil from said chamber all in a predetermined sequential forming operation.

10. In a stapler, a housing having a forming chamber, a staple guide passageway extending from said chamber to the end of said housing, a staple drive plunger guided to move within and along said chamber and staple guide passageway to the end thereof, a feed roll intermittently driven by said plunger to feed a continuous strip of wire into said chamber in a direction normal to the path of travel of said plunger, an anvil movably mounted on said housing to move into a position on one side of the line of travel of said wire, two forming dies pivotally mounted on said housing on opposite sides of said anvil to move from a position on the opposite side of the line of travel of said wire from said anvil into engagement with the wire, and to form the wire on said anvil, a cutting block interposed between said feed roll and one of said forming dies and having an inclined advance face facing said anvil, a wire guide intersecting said inclined advance face, a wire shearing and pointing blade on the forming die adjacent said anvil and movable with said forming die along the inclined face of said cutting block to shear a length of wire to staple length and to point the same, spaced camming surfaces on said staple drive plunger and cooperating camming means associated with said anvil, intermittent feed mechanism and forming dies, to actuate the same in a predetermined staple cutting and forming sequence.

11. In a stapler of the class described, a housing having a staple guide extending therefrom, a staple drive plunger guided to move within and along said staple guide, wire feeding means operated by reciprocable movement of said plunger comprising a feed roll journaled in said housing, a ratchet device operated by engagement with said plunger to drive said feed roll, said feed roll having a converging wire engaging groove recessed in the face thereof to recess the wire partially within said roll and to grippingly engage the sides thereof, a spring urged pinch roll to engage the wire with said groove, a cutter block spaced in advance of said feed roll and having a wire guide extending therethrough in alignment with the line of travel of the wire between said feed and pinch rolls and having a receding cutting face, a pivoted arm actuated to move along said face by movement of said plunger along said guide, a forming die on the free end of said arm, a second arm pivoted on the opposite side of said plunger from said first arm having a forming die thereon facing said first forming die, and an anvil pivotally mounted on said housing to move into the space between said forming dies and cooperating therewith to form the wire to staple form upon the staple forming stroke of said arms.

12. A stapler of the class described comprising a housing having a staple guide nose extending therefrom with a staple guide in said nose and extending therealong, a staple drive plunger guided for movement within and along said housing and nose and having a staple engaging recess on the end face thereof, a fluid pressure cylinder and piston on the opposite end of said housing from said nose and connected with said plunger to reciprocably move said plunger along said housing, two pivoted forming dies pivoted within said housing on opposite sides of the path of travel of said plunger therealong in widely spaced relation with respect to each other, cam means connected with said forming dies and engaged by said plunger for moving said forming dies upwardly upon the return stroke of said plunger and downwardly into a position parallel to said plunger on opposite sides of the path of travel thereof upon the staple driving stroke thereof, an anvil pivoted outside of said housing to move into and from the space between said forming dies to cooperate with said forming dies, cam means on said plunger engageable with said anvil upon the driving and return strokes of said plunger to move said anvil into and out of cooperative relation with respect to said forming dies, and out of the path of travel of said plunger upon the driving stroke thereof.

13. A stapler comprising a housing having a guide nose extending from one end thereof and a staple guide extending within and along said nose, a staple drive plunger guided to move within and along said housing and nose, said plunger having a recessed staple engaging end face, a fluid motor mounted on the opposite end of said housing from said nose and having connection with said plunger to reciprocably move the same, means actuated by said plunger to intermittently feed staple wire within said housing, other means actuated by said plunger, to sever the wire to staple length and point the ends thereof comprising a cutting block secured within asid housing and having a wire guide extending therethrough perpendicular to said plunger and also having an inclined advance cutting face, a shearing blade movable along said face to sever the wire at the inclination of said face, and two spaced facing forming dies pivoted within said housing adjacent opposite sides thereof in widely spaced relation with respect to said plunger and beneath said cutter block to move from angular positions above said wire guide downwardly along said cutter block into positions parallel to said plunger, one of said dies having said shearing blade secured thereto to move along said inclined cutting face of said cutting block, and cam means connected with said dies and actuated by said plunger to move said forming dies into and out of forming engagement with the staple wire.

14. A stapler comprising a housing having a guide nose extending therefrom with a staple guide extending within and along said nose, a staple drive plunger guided for movement within said housing and nose, a fluid operated motor on the opposite end of said housing from said nose, to reciprocably drive said plunger, means actuated by said plunger to intermittently feed staple wire within said housing, means to sever the wire to staple length and to point the ends thereof comprising a cutting block secured to said housing and having an inclined cutting face and a wire guide intersecting said face, a shearing blade movable along said cutting face, two spaced facing forming dies pivoted within said housing adjacent opposite sides thereof and beneath said cutting block to move from elevated angular positions above said cutting block downwardly into parallel staple forming positions, one of said dies having said shearing blades secured thereto, a rocking arm pivoted on the outside of said housing and having an anvil on one end thereof movable within said housing, cam means connected with each of said forming dies, means on said plunger engageable with said cam means to actuate the same, and a cam on said plunger engageable with said rocking arm and rocking the same, to extend said anvil between and withdraw said anvil from said forming dies, upon the respective return and staple driving strokes of said plunger.

15. In a stapler of the class described, a housing having a central forming chamber, a nose extending from said housing having a staple guide therein, leading from said chamber, step-by-step feeding means for feeding wire into said forming chamber in incremental lengths equal to the length of the staple to be formed, a cutter block through which the wire is trained, an anvil pivotally mounted on said housing on the outside of said forming chamber, to move into and out of said forming chamber and disposed beneath the plane of travel of the wire into said chamber, a staple drive plunger guided to move into and out of said chamber and along said nose, two forming dies, one of said forming dies having a cutter blade thereon movable along said cutter block to cut the wire to length, said forming dies being pivoted on opposite sides of said anvil in spaced relation with respect thereto and beneath the path of travel of the wire into said housing, to move from positions above the path of travel of the wire into said housing downwardly to engage the wire and move along opposite sides of said anvil, to bend the wire to conform to said anvil, means actuated by said plunger to actuate said forming dies, and other means actuated by said plunger to move said anvil into and out of cooperative relation with respect to said forming dies.

E. GUNNAR SANDBERG.

References Cited in the file of this patent

UNITED STATES PATENTS

| Number | Name | Date |
| --- | --- | --- |
| 915,862 | Hunter | Mar. 23, 1909 |
| 965,588 | Lay | July 26, 1910 |
| 2,145,461 | Smith | Jan. 31, 1939 |
| 2,554,691 | Zeruneith | May 29, 1951 |
| 2,564,886 | Epple et al. | Aug. 21, 1951 |